United States Patent Office 3,795,705
Patented Mar. 5, 1974

3,795,705
PROCESS FOR MAKING ARYLSULFONYL HALIDES
James H. Chan, El Cerrito, Calif., assignor to Stauffer Chemical Company, New York, N.Y.
No Drawing. Continuation of application Ser. No. 786,474, Dec. 23, 1968. This application Aug. 28, 1972, Ser. No. 284,187
Int. Cl. C07c 143/70
U.S. Cl. 260—543 R          17 Claims

ABSTRACT OF THE DISCLOSURE

Arylsulfonyl halides such as benzenesulfonyl chloride are produced by reacting a sulfonic acid and a carbonyl halide in the presence of dimethylformamide and a small percentage of a tertiary amine. The reaction of benzenesulfonic acid with phosgene in the presence of 15% dimethylformamide and 1% triethylamine to produce benzenesulfonyl halide in high yields and having a high degree of purity is representative.

---

This is a continuation of application Ser. No. 786,474, filed Dec. 23, 1968.

The present invention relates to the production of arylsulfonyl halides, and more particularly it relates to the production of arylsulfonyl halides in an economical and efficient manner.

Arylsulfonyl halides such as, e.g., benzenesulfonyl chloride, are particularly useful as intermediates in the manufacture of certain biologically active compounds. For example, benzenesulfonyl chloride can be reacted with primary or secondary amines to produce certain arylsulfonamides such as, e.g., N-(β-O,O-diisopropyldithiophosphorylethyl)-benzenesulfonamide.

It is desirable under certain circumstances to produce the arylsulfonyl chlorides from available phosgene and arylsulfonic acids. Unfortunately the known reaction of benzenesulfonic acid with phosgene in the presence of dimethylformamide at temperatures up to 150° C. results in a very low yield of benzenesulfonyl chloride. It is therefore the object of the present invention to overcome and eliminate the inherent disadvantages in the production of arylsulfonyl halides from these starting materials.

Another object is to provide an economical and efficient method for the production of relatively pure arylsulfonyl halides in high yields.

Another object of the present invention is to provide a method for the production of benzenesulfonyl chloride or parachlorobenzenesulfonyl chloride by the reaction of the appropriate arylsulfonic acid with phosgene.

The objects of the present invention are generally accomplished by the reaction of an arylsulfonic acid and a carbonyl halide in the presence of dimethylformamide and a tertiary amine to produce the corresponding arylsulfonyl halide. The reaction is formulistically represented as follows:

In the reaction AR represents an aryl moiety which includes phenyl or substituted phenyl and naphthyl or substituted naphthyl. The substituents include halides, and particularly, chlorine, bromine, fluorine and iodine, alkyl and alkenyl groups, preferably lower alkyl or lower alkenyl, nitro and cyano groups and combinations of the aforementioned substituents. Representative arylsulfonic acids employed in the process of this invention include, but are not limited to the following:

benzene sulfonic acid,
chlorobenzene sulfonic acids,
trichlorobenzene sulfonic acids,
naphthalene sulfonic acids,
toluene sulfonic acids.

In the reaction, X represents a halide which is either chlorine or bromine. Phosgene (carbonyl chloride) is a preferred reactant. DMF represents dimethylformamide and T–A represents a tertiary amine. In the practice of the present invention it has been discovered that the presence of a small percentage of a tertiary amine promotes the reaction under relatively mild conditions and results in a high yield and high degree of purity of the desired arylsulfonyl chloride. Representative tertiary amines employed in the present invention include but are not limited to the following:

triethylamine,
pyridine,
picolines,
lutidines,
N,N-dimethylaniline.

Reaction conditions vary depending upon the particular reactants and products which are desired and the process equipment in which the reaction is to be carried out. However, in the preparation of benzenesulfonyl chloride or parachlorobenzenesulfonyl chloride, a reaction temperature between about 15 and about 100° C. is preferred, and a temperature between about 50 and about 90° C. is most preferred. It is desirable to avoid high temperatures in these reactions in order to minimize decomposition. Preferably, between about 12 and about 16% by weight of dimethylformamide based on the weight of sulfonic acid is present in the reaction zone. It has been found that employing only 10% DMF results in very slow reaction and poor yield. The presence of at least about .5% by weight of a suitable tertiary amine, based on the weight of arylsulfonic acid, is preferred, although the presence of between about .5 and about 2% by weight of the tertiary amine is most preferred. The reaction can be carried out satisfactorily at atmospheric pressure.

A preferred method of carrying out the reaction of the present invention involves charging to a suitable reaction vessel the desired quantity of an arylsulfonic acid, dimethylformamide and tertiary amine. The carbonyl halide is then either added dropwise as a liquid or bubbled as a liquid or bubbled as a gaseous material at the desired rate into the existing charge in the reaction vessel. The carbonyl halide is preferably added to the reaction until the evolution of hydrogen halide has ceased. An excess of the carbonyl halide over the stoichiometric amount required to chlorinate the arylsulfonic acid is preferred to fully react with dimethylformamide. The arylsulfonyl halide product is preferably separated from the reacted mass by suitable distillation methods and means, such as, for example, vacuum distillation.

Having thus described the invention in general terms, reference is now made to specific examples which should not be construed as unduly limiting thereof.

EXAMPLE I

The apparatus described is employed in Example I and subsequent examples. A 100-ml. round-bottomed 3-necked flask is fitted with a magnetic stirrer, heating mantle, thermometer, and a graduated pressure-equilibrated dropping funnel to which is added a "Y-tube." One arm of the Y-tube is fitted with a Dry-Ice condenser and the other side-arm is connected to a tank of phosgene by a rubber tubing. The outlet arm of the Dry Ice condenser is connected to a gas bubbler.

In this example, into the reaction flask is introduced 0.1 mole (19.2 g. of about 90% purity) p-chlorobenzenesulfonic acid containing 15% (2.9 g.) of dimethylformamide and 1% (0.2 g.) of a triethylamine. The contents in the flask are heated to 50–60° C. to liquify the solid and maintained at this temperature during the reaction. Liquid phosgene (B.P. 8° C., specific gravity 1.39) is then carefully added dropwise through the graduated, pressure-equilibrated dropping funnel.

Hydrogen chloride is evolved during the course of the reaction. For a 0.1 mole run, the reaction is complete in 30–40 minutes, at which time hydrogen chloride gas evolution ceases and there is no further uptake of phosgene. Unreacted phosgene is driven off and collected in the addition funnel by heating the reaction mixture to 90–100° C. for a period of 15–20 minutes.

The reaction vessel is then set up for vacuum distillation using a 20 cm. vacuum-jacketed vigreaux column. Traces of phosgene are removed under vacuum (water-aspirator, 50–70° C./10 cm. Hg vacuum) for a period of 15–20 minutes after which the product is purified by vacuum distillation using a vacuum pump that vents into a hood.

EXAMPLE II

The procedure of Example I is repeated, this time using benzenesulfonyl chloride as the reactant in place of parachlorobenzenesulfonyl chloride. The product yield and purity for Examples I and II are shown in Table I below.

TABLE I

| Product | Percent yield | Purity |
|---|---|---|
| p-Chlorobenzene-sulfonyl chloride. | 80–83% based on crude acid (actual yield=90–93%). | M.P. 50–52° C. (literature value is 53° C.); vpc 1 peak, no DMF detected. |
| Benzenesulfonyl chloride. | 87% based on crude acid (actual yield= 92%). | B.P. 90.5° C. at 4 mm. Hg vacuum; colorless, clear liquid; vpc 1 peak, no DMF detected. |

EXAMPLES III–V

Other arylsulfonyl halides are made in the manner specified in Example I starting with the appropriate arylsulfonic acid. Employing the procedures and apparatus described in Example I, corresponding arylsulfonyl chlorides are made starting with 2-naphthalene sulfonic acid, 2,4,5-trichlorobenzenesulfonic acid, and methylbenzenesulfonic acid.

EXAMPLES VI–XII

These examples are carried out employing the apparatus, procedures, and reactants described in Example I. However, in place of 1% triethylamine, 1% of the following tertiary amines is employed in each of these examples:

pyridine
2-picoline
3-picoline
4-picoline
mixture of 3- and 4-picoline
2,6-lutidine
N,N-dimethylaniline The yield and purity of p-chlorobenzenesulfonyl chloride as well as reaction rate appear to be essentially comparable to Example I in each case.

EXAMPLE XIII

In this example, 10% DMF and 2% triethylamine are present in the p-chlorobenzenesulfonic acid charged to the apparatus described in Example I. In this case the reaction temperature is maintained at 70° over a period of 2 hours while phosgene is added. At the end of this period it is found that less than a tenth of the amount of phosgene required for complete reaction is taken up by the reactants.

EXAMPLE XIV

In this example, 15% DMF is present in the p-chlorobenzenesulfonic acid charged to the apparatus described in Example I. No tertiary amine is charged. The reaction temperature is maintained at 70° C. while phosgene is charged. The reaction temperature is maintained for 5 hours. No phosgene reacted under these conditions.

EXAMPLE XV

This example is carried out employing the apparatus, procedures and reaction conditions described in Example I with the following modifications. The tertiary amine employed in this case is pyridine. When there is noted no further uptake of phosgene, the reaction flask containing the reacted materials is again charged with 0.1 mole of p-chlorobenzenesulfonic acid. No additional DMF or tertiary amine is charged. Phosgene is added dropwise again until HCl evolution ceases. This recharging procedure is repeated five more times. Each successive time the reaction time is essentially the same as the initial reaction indicating no loss of catalyst activity. The product material is then recovered and purified in the manner described in Example I.

Having thus described the invention by reference to specific examples, many modifications and alterations will become apparent to those skilled in the art without departing from the spirit and scope thereof.

What is claimed is:

1. A method of producing an arylsulfonyl chloride or bromide comprising reacting an arylsulfonic acid and a carbonyl chloride or bromide in the presence of at least about 12 percent by weight dimethylformamide based on the weight of the arylsulfonic acid, and at least about 0.5 percent by weight, based on the weight of the arylsulfonic acid, of a tertiary amine to produce the arylsulfonyl halide and gaseous HCl or HBr.

2. A method comprising reacting a compound having the formula $ARSO_3H$, wherein AR represents a member selected from the group consisting of phenyl; substituted phenyl, the substituents being selected from the group consisting of chloro, bromo, fluoro, iodo, lower alkyl, lower alkenyl, nitro, cyano, and combinations thereof; naphthyl; substituted naphthyl, the substituents being selected from the group consisting of chloro, bromo, fluoro, iodo, lower alkyl, lower alkenyl, nitro, cyano, and combinations thereof, with a carbonyl halide selected from the group consisting of phosgene and carbonyl bromide in the presence of at least about 12 percent by weight dimethyl formamide, based on the weight of the $ARSO_3H$, and at least 0.5 percent by weight, based on the weight of the $ARSO_3H$, of a tertiary amine, to produce an arylsulfonyl chloride or bromide and a gas selected from HCl and HBr.

3. The method of claim 2 in which said reaction is carried out at a temperature between about 15 and about 100° C.

4. The method of claim 3 in which said arylsulfonic acid comprises benzenesulfonic acid.

5. The method of claim 3 in which arylsulfonic acid comprises parachlorobenzenesulfonic acid.

6. The method of claim 3 in which said tertiary amine is selected from the group consisting of triethylamine, pyridine, picolines, lutidines and N,N-dimethylaniline.

7. The method of claim 3 in which said tertiary amine comprises triethylamine.

8. The method of claim 3 in which said tertiary amine comprises pyridine.

9. The method of claim 3 in which said tertiary amine comprises 2-picoline.

10. The method of claim 3 in which said tertiary amine comprises 3-picoline.

11. The method of claim 3 in which said tertiary amine comprises 4-picoline.

12. The method of claim 3 in which said tertiary amine comprises a mixture of 3- and 4-picolines.

13. The method of claim 3 in which said tertiary amine comprises 2,6-lutidine.

14. The method of claim 3 in which said tertiary amine comprises N,N-dimethylaniline.

15. The method of claim 3 in which said carbonyl halide comprises phosgene.

16. The method of claim 3 in which said reaction is carried out at a temperature between about 50 and about 90° C.

17. The method of claim 16 in which said dimethylformamide is present between about 12 and about 16% by weight of the arylsulfonic acid.

References Cited

UNITED STATES PATENTS

| | | | |
|---|---|---|---|
| 3,706,794 | 12/1972 | Horner | 260—543 R |
| 3,337,512 | 8/1967 | Hall | 260—79.3 |
| 3,322,828 | 5/1967 | Muth | 260—556 |

FOREIGN PATENTS

| | | | |
|---|---|---|---|
| 553,871 | 1/1957 | Belgium. | |
| 581,615 | 8/1959 | Canada | 260—543 |

OTHER REFERENCES

Kittila, DMF (Du Pont Co.) 1967, p. 76.
Fieser et al., Reagents for Org. Synth., p. 1202.

LORRAINE A. WEINBERGER, Primary Examiner

R. D. KELLY, Assistant Examiner

U.S. Cl. X.R.

260—465 R, 465 G